(12) United States Patent
Dattatreya et al.

(10) Patent No.: US 8,370,622 B1
(45) Date of Patent: Feb. 5, 2013

(54) METHOD AND APPARATUS FOR INCREASING THE OUTPUT OF A CRYPTOGRAPHIC SYSTEM

(75) Inventors: Mohan Dattatreya, Sunnyvale, CA (US); Mohana Posam, Sunnyvale, CA (US); Abha Jain, San Jose, CA (US); Ayfang Yang, Cupertino, CA (US)

(73) Assignee: Rockstar Consortium US LP, New York, NY (US)

( * ) Notice: Subject to any disclaimer, the term of this patent is extended or adjusted under 35 U.S.C. 154(b) by 1179 days.

(21) Appl. No.: 12/006,279

(22) Filed: Dec. 31, 2007

(51) Int. Cl.
*H04L 29/06* (2006.01)
(52) U.S. Cl. .......... 713/151; 713/192
(58) Field of Classification Search .......... 713/150–165, 713/192
See application file for complete search history.

(56) References Cited

U.S. PATENT DOCUMENTS

| | | | | |
|---|---|---|---|---|
| 5,938,749 A * | 8/1999 | Rusu et al. | ...... | 710/54 |
| 5,953,318 A * | 9/1999 | Nattkemper et al. | ...... | 370/236 |
| 5,999,518 A * | 12/1999 | Nattkemper et al. | ...... | 370/258 |
| 6,052,786 A * | 4/2000 | Tsuchida | ...... | 726/14 |
| 6,141,323 A * | 10/2000 | Rusu et al. | ...... | 370/236 |
| 6,148,082 A * | 11/2000 | Slattery et al. | ...... | 380/212 |
| 6,577,679 B1 * | 6/2003 | Apostolopoulos | ...... | 375/240.12 |
| 6,606,666 B1 * | 8/2003 | Bell et al. | ...... | 709/232 |
| 6,794,893 B2 * | 9/2004 | Lin et al. | ...... | 326/16 |
| 6,990,113 B1 * | 1/2006 | Wang et al. | ...... | 370/412 |
| 7,536,560 B2 * | 5/2009 | Henry et al. | ...... | 713/190 |
| 7,734,950 B2 * | 6/2010 | Rogers | ...... | 714/5.11 |
| 7,779,232 B2 * | 8/2010 | Doing et al. | ...... | 712/207 |
| 7,904,711 B2 * | 3/2011 | Mackey et al. | ...... | 713/151 |
| 2002/0114451 A1 * | 8/2002 | Satterfield | ...... | 380/37 |
| 2002/0116562 A1 * | 8/2002 | Mathuna et al. | ...... | 710/105 |
| 2003/0074388 A1 * | 4/2003 | Pham et al. | ...... | 709/106 |
| 2003/0074473 A1 * | 4/2003 | Pham et al. | ...... | 709/246 |
| 2003/0160651 A1 * | 8/2003 | Lin et al. | ...... | 330/2 |
| 2004/0052375 A1 * | 3/2004 | Craft et al. | ...... | 380/256 |
| 2005/0076228 A1 * | 4/2005 | Davis et al. | ...... | 713/188 |
| 2005/0157871 A1 * | 7/2005 | Komano et al. | ...... | 380/28 |
| 2006/0056300 A1 * | 3/2006 | Tamura et al. | ...... | 370/235 |
| 2006/0062319 A1 * | 3/2006 | Kloos | ...... | 375/264 |
| 2006/0083489 A1 * | 4/2006 | Aridome et al. | ...... | 386/124 |
| 2006/0143473 A1 * | 6/2006 | Kumar | ...... | 713/189 |
| 2007/0014400 A1 * | 1/2007 | Wack et al. | ...... | 380/44 |
| 2007/0076802 A1 * | 4/2007 | Osamoto et al. | ...... | 375/240.26 |
| 2007/0076803 A1 * | 4/2007 | Osamoto et al. | ...... | 375/240.29 |
| 2007/0098153 A1 * | 5/2007 | Nishikawa | ...... | 380/30 |
| 2007/0250554 A1 * | 10/2007 | Bendraoui et al. | ...... | 708/200 |
| 2008/0028233 A1 * | 1/2008 | Shiomi et al. | ...... | 713/189 |
| 2008/0052537 A1 * | 2/2008 | Nishizono | ...... | 713/193 |
| 2008/0117913 A1 * | 5/2008 | Tatar et al. | ...... | 370/392 |
| 2008/0170630 A1 * | 7/2008 | Falik et al. | ...... | 375/240.29 |
| 2009/0063819 A1 * | 3/2009 | Doing et al. | ...... | 712/205 |
| 2009/0113201 A1 * | 4/2009 | Mackey et al. | ...... | 713/151 |

* cited by examiner

*Primary Examiner* — David Garcia Cervetti
(74) *Attorney, Agent, or Firm* — Anderson Gorecki & Rouille, LLP

(57) ABSTRACT

The rate at which packets are provided to a cryptographic engine of a cryptographic system may be adjusted using a feedback mechanism to increase the output of the cryptographic system. Data is classified and queued on a per class/flow basis and stored in input queues prior to being processed by the cryptographic engine. A class based queue scheduler is implemented to select data from the input queues to be transmitted to the cryptographic engine. The cryptographic engine operates in processing cycles. At each cycle, an amount of data is transferred from the input queues to a cryptographic engine input queue. A cryptographic accelerator in the cryptographic engine processes the data on the cryptographic engine input queue during the cycle. The output rate of the cryptographic accelerator is measured during the cycle and this value is used as feedback to determine how much data should be passed to the cryptographic engine for a subsequent cycle.

18 Claims, 3 Drawing Sheets

METHOD AND APPARATUS FOR INCREASING THE OUTPUT OF A CRYPTOGRAPHIC SYSTEM

TECHNICAL FIELD

The present invention relates to encryption acceleration and, more particularly, to a method and apparatus for increasing the output of a cryptographic system.

BACKGROUND

Data communication networks may include various computers, servers, hubs, switches, nodes, routers, proxies, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

FIG. 1 illustrates an example communication network 10. As shown in FIG. 1, end users 12 will connect to the network 10 by connecting to an access network element 14. The access network elements connect to a core network implemented using core network elements 16. Links 18 interconnect all the various network elements so that data may be transmitted across the network. Many network architectures exist and the network shown in FIG. 1 is merely intended to be a reference network, and is not therefore intended to be limiting of the claims or the invention set forth below.

It is often desirable to encrypt the data before the data is transmitted on to the communication network by the end user 12 or at the ingress network element 14, so that it may be protected from being viewed and/or modified as it crosses the network 10. Thus, in the reference network of FIG. 1, either the end user equipment 12 or the access network element 14 may implement a cryptographic system to encrypt data before it is transmitted across network 10 and to decrypt data as it is received from the network 10. The cryptographic system may also perform other tasks such as compressing the data and signing the data.

FIG. 2 is a simplified functional block diagram of a network element 20 that may be used to implement end user equipment 12, access network elements 14, or core network elements 16. Many different ways of implementing network elements have been developed over time. For example, one common way is for the network element 20 to include a data plane and a control plane. The data plane handles data traffic on the network and the control plane interacts with other network elements, i.e. by engaging in protocol exchanges with other network elements, to determine how the network element should behave on the network. The control plane will then interact with the data plane to specify how the data plane should operate in connection with handling particular types of data or particular flows of data. Since the various techniques described herein reside primarily in the data plane, with minimal interaction with the control plane, only the data plane of the network element of FIG. 2 has been shown.

As shown in FIG. 2, the network element 20 includes a plurality of input/output cards 22. The I/O cards 22 have physical interfaces to links 18 to receive signals from the links according to whatever physical protocol is in operation on that link, to specify how the signals should be formatted for transmission on the particular link. The I/O cards thus allow the network element 20 to receive signals from the physical media implementing the links 18 and convert the signals into bits/bytes of data. When transmitting data, the I/O cards will conversely take the bits/bytes and format the physical signals that will be output onto the links 18. The I/O cards may perform other functions as well, such as framing the data to create PDUs from the received signals, depending on the implementation of the network element.

Once data has been received by the network element 20, it will be processed by a network processor 24 and optionally may be encrypted/decrypted by an cryptographic system 26. The data may be passed through a switch fabric 28 before or after being encrypted/decrypted and optionally may be processed by a different network processor 24 or the same network processor a second time before being output by the same I/O card or a different I/O card. Many network element architectures have been developed over time and, thus, the network element shown in FIG. 2 is merely intended as a reference network element.

When data is to be encrypted or decrypted, the data will be passed to the cryptographic system 26 for processing. The amount of data that a cryptographic system can handle in a given period of time is not constant, but rather is a function of the size of the packets that are being input to the cryptographic system, the transform algorithm being used by the cryptographic system, and whether the cryptographic system is encrypting the data or decrypting the data. Packet size is of particular importance when determining the throughput of a cryptographic system, as a cryptographic system may be able to handle a significantly higher volume of data formed as large sized packets than it can when the data is formed as smaller sized packets.

Cryptographic processing may be a relatively slow process and, hence, the cryptographic system may form a bottleneck on the amount of data a network element is able to handle. Accordingly, optimizing the use of the cryptographic system to output as much data as possible is important to the overall performance of the network element. Previously attempts have been made to optimize the output of the cryptographic system by queuing the data before sending the data to the cryptographic system, and then inputting the data at a steady rate from the input queue to the cryptographic system. This allows data to be available for the cryptographic system so that the cryptographic system has a steady stream of data to encrypt/decrypt and thus is more likely to be able to operate efficiently. Unfortunately, as discussed above, the amount of data a cryptographic system is able to process may vary dramatically depending on the format/size of the input data and the process to be implemented on the data. Thus, inputting the data at a steady state results in either under-utilization of the cryptographic system if the steady-state value of the amount of data to be input is selected based on the lowest sustained throughput, or oversubscription of the cryptographic system if the steady-state value of the amount of data to be input is selected based on the highest sustained throughput. In either case performance is not optimal, because either the cryptographic system is underutilized, or is occasionally overutilized which can cause packets to be dropped.

SUMMARY OF THE INVENTION

The rate at which packets are provided to a cryptographic engine of a cryptographic system may be adjusted using a feedback mechanism to increase the output of the cryptographic system. Data is classified and queued on a per class/flow basis and stored in input queues prior to being processed by the cryptographic engine. A class based queue scheduler is implemented to select data from the input queues to be transmitted to the cryptographic engine. The cryptographic engine operates in processing cycles. At each cycle, an amount of data is transferred from the input queues to a cryptographic engine input queue. A cryptographic accelerator in the cryptographic engine processes the data on the cryptographic engine input queue during the cycle. The output rate of the cryptographic accelerator is measured during the cycle and this value is used as feedback to determine how much data should be passed to the cryptographic engine for a subsequent cycle. Feedback may be implemented using an exponential weighted moving average or another weighted moving average algorithm.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
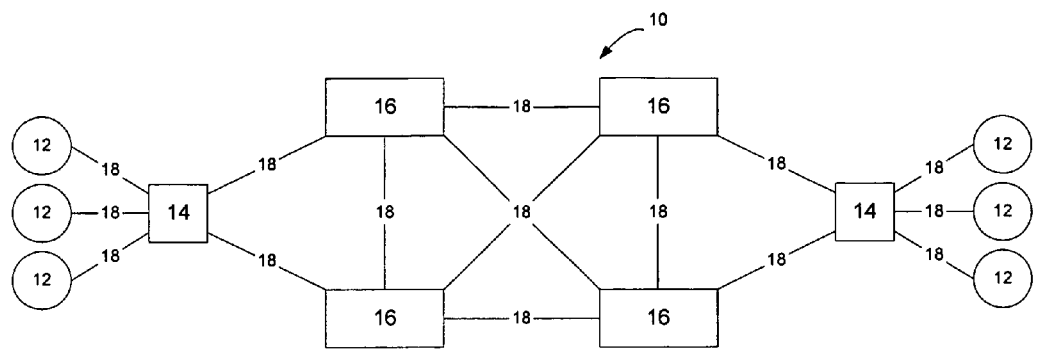
FIG. 1 is a functional block diagram of an example communication network.
Figure 2:
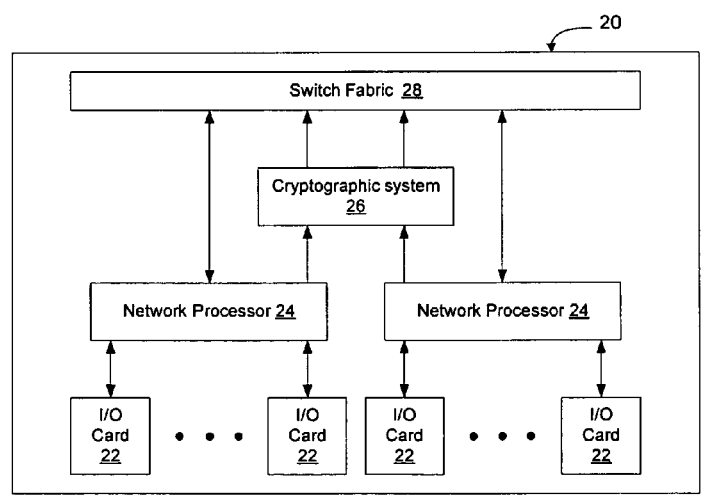
FIG. 2 is a functional block diagram of an example network element that may be used on the reference network of FIG. 1.
Figure 3:
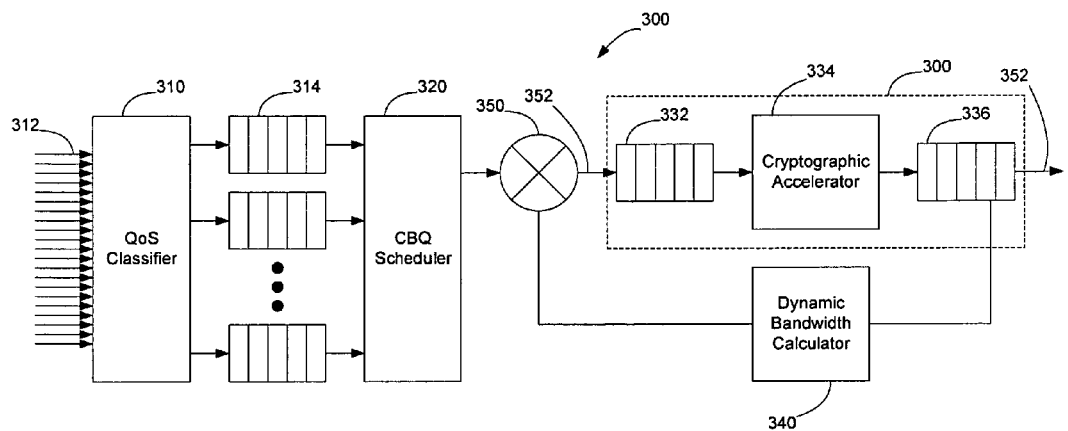
FIG. 3 is a functional block diagram of a cryptographic system according to an embodiment of the invention.

FIG. 3 shows a cryptographic system according to an embodiment of the invention. As shown in FIG. 3, the cryptographic system 300 includes a Quality of Service (QoS) classifier 310 that receives data 312 and classifies the data. One way of classifying data is to look at the QoS bits in a packet header or frame header. For example, Internet Engineering Task Force (IETF) Request For Comments (RFC) 2697 defines a single rate three color marker that may be used to classify traffic as green, yellow, or red depending on whether the traffic is in-profile or out of profile. Similarly, IETF RFC 2698 defines a two rate three color marker that may be used to classify traffic as green, yellow, or red. Each of these methods of classifying traffic causes individual packets to be marked by causing a Differentiated Services Code Point (DSCP) value to be set in the Differentiated Services field of an IP header of an IP packet. The Differentiated Services field for both IPv4 and IPv6 is set forth in IETF RFC 2474.

In addition to determining the class of traffic by looking at the DS field, the QoS classifier may look at other aspects of the traffic to determine how the traffic should be handled. For example, the QoS classifier may classify traffic on a per-flow basis to separate flows of traffic on the network so that different flows may be treated differently by the network element. Additionally, the QoS classifier may determine the type of traffic being carried by the incoming packets and sort the incoming packets according to the latency sensitivity or other characteristics of the packets. For example, voice traffic is generally more sensitive to latency than data traffic. Accordingly, the QoS traffic may separate voice traffic or other traffic that needs to be handled on an expedited basis from traffic that is less sensitive to latency and classify the traffic on that basis.

The QoS classifier 310 thus takes the input data 312, classifies the input data, and stores the data in a plurality of input queues 314. A separate input queue may be used for each class of traffic so that the different types of traffic (green, yellow, red) are stored in such a manner as to be selectable for processing by the remaining components of the cryptographic system 300. Similarly, individual queues 314 may be provided for different flows of traffic so that different flows of data may be queued separately and treated individually by the network element. Multiple queues may be used depending on how the network element is required to handle data and prioritize particular types of traffic. Thus, many different queues may be used and the QoS classifier may cause traffic to be placed into the queues to allow the network element to implement the particular policy required for the various types of traffic on the network.

The cryptographic system 300 also includes a Class Based Queuing (CBQ) scheduler 320 that selects data from the input queues 314 to be processed by a cryptographic engine 330. Since the QoS classifier is able to cause different classes and/or flows of data to be stored in different queues for processing by the cryptographic engine 330, the CBQ scheduler is able to schedule data on a per-flow or per-class basis. Accordingly, the CBQ scheduler may prioritize latency sensitive traffic, may be used to guarantee bandwidth for different traffic flows, or to otherwise implement differential treatment for different classes and/or flows of traffic on the network.

The CBQ scheduler is also responsible for shaping traffic by adjusting the size of the input queues 314. Specifically, the CBQ scheduler may adjust the size of the input queues 314 dynamically to allow different amounts of data to be stored in each of the input queues 314. By adjusting the size of the input queues, the CBQ scheduler can dictate how much traffic of a particular type may be stored for that class/flow. Similarly the CBQ scheduler may control the rate at which data is read from a particular input queue 314. These two values may be adjusted dynamically and together allow the CBQ scheduler to perform traffic shaping to control the volume and rate at which data of a particular class/flow is transmitted on the network. The CBQ scheduler thus performs traffic shaping and policing by causing the size of the input queues to be adjusted according to network policy.

As shown in FIG. 3, the cryptographic system 300 includes a cryptographic engine 330, which may be a commercially available cryptographic engine such as a cryptographic engine available from Hifn™. The invention is not limited to use with one of these particular cryptographic engines, however, as other types of cryptographic engines may be used as well. Thus, these several mentioned cryptographic engines are merely examples of several cryptographic engines that may be used in connection with an embodiment of the invention.

In the example shown in FIG. 3, the cryptographic engine 330 includes a cryptographic accelerator input queue 332, a cryptographic accelerator 334 and a cryptographic accelerator output 336. The cryptographic accelerator output in this example is shown as a queue, but in operation the cryptographic accelerator output may be a raster that is polled periodically by the network element to pull data 338 from the cryptographic engine.

The cryptographic accelerator 330, in one embodiment, operates to encrypt/decrypt batches of data in cycles. Specifically, a batch of data 352 will be input to the cryptographic accelerator input queue 332 and the cryptographic accelerator will operate on that data during the processing cycle. Thus, the cryptographic accelerator input queue serves to store the data for processing by the cryptographic accelerator during one processing cycle. The processing cycle may be 5 ms in duration or some other cycle depending on the particular cryptographic engine 330 selected to implement an embodiment of the invention. In operation, the CBQ scheduler 320 will select data to be transferred from the class based input queues 314 to the cryptographic accelerator input queue 332. The cryptographic accelerator 334 will then process the data at its maximum rate until it runs out of data in the input queue.

According to an embodiment of the invention, the rate at which data is processed and output from the cryptographic accelerator 334 may be measured and used to adjust the amount of data that is fed by the CBQ scheduler 320 to the cryptographic accelerator input queue 332, so that the amount of data that is provided to the cryptographic engine during a processing cycle closely approximates the amount of data that the cryptographic accelerator is likely to be able to handle during that cycle. Alternatively, in another embodiment, a fixed amount of data may be input to the cryptographic engine during a processing cycle, but the duration of the processing cycle may be adjusted (shortened or lengthened) to allow the cryptographic accelerator to receive data sooner or later depending on the rate at which the cryptographic accelerator is able to process the data. Thus, by using a closed loop feedback system, using feedback from the output of the cryptographic accelerator 330, the amount of data input to the cryptographic accelerator during a subsequent cycle is more likely to more closely approximate the amount of data likely to be able to be processed by the cryptographic accelerator during that subsequent cycle. In the alternative embodiment, the amount of time allocated to the cryptographic accelerator may be adjusted so that the cryptographic accelerator is kept close to continuously busy. This may increase the output of the cryptographic engine by making a maximum amount of data available for processing by the cryptographic accelerator without significantly risking passing too much data to the cryptographic accelerator.

Figure 4:
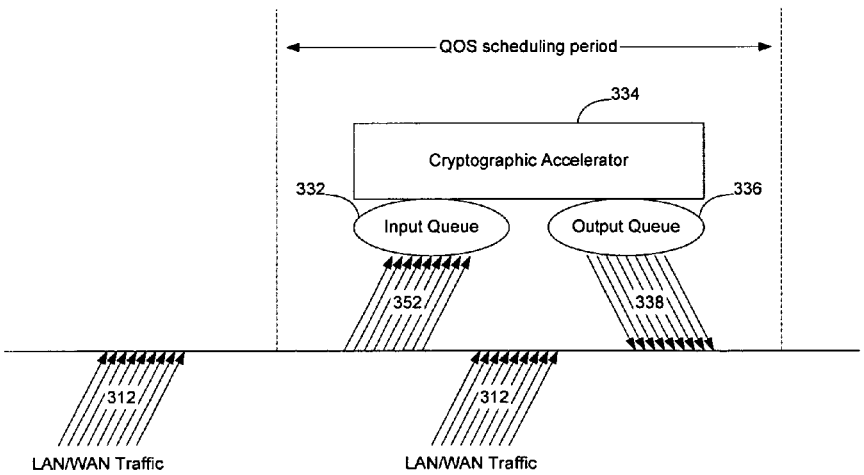
FIG. 4 is a timeline showing the flow of data in the cryptographic system of FIG. 3 according to an embodiment of the invention.

FIG. 4 shows the timing of how data is handled by the cryptographic system during an operating cycle. As shown in FIG. 4, LAN/WAN traffic 312 will be received at the input to the cryptographic system 300. The traffic 312 may arrive at any time, and is processed by the QoS classifier 310 and put into queues to be selected for processing by the CBQ scheduler.

Periodically, the CBQ scheduler will select data 352 to be transmitted from the class based input queues 314 to the cryptographic accelerator input queue 332. The CBQ scheduler may use any one of a number of known ways of selecting data from the various input queues. For example, the CBQ scheduler may use a simple round robin approach to select data from the queues, may use a weighted round robin approach, or any other desired approach. The invention is not limited by the particular method implemented by the CBQ scheduler to select data from the various input queues for transmission.

In the example shown in FIG. 4, the CBQ scheduler operates on a set processing cycle, such as a 5 ms processing cycle, such that it will cause data to be transferred into the cryptographic accelerator input queue 332 during every scheduling cycle. Where the processing cycle is 5 ms, the CBQ scheduler will therefore cause data to be transferred to the cryptographic accelerator input queue 332 every 5 ms. In the alternate embodiment, where the duration of the scheduling cycle is adjusted, the CBQ scheduler may transfer data to the cryptographic accelerator input queue 332 every n ms, where n is adjusted in accordance with the feedback provided by the dynamic bandwidth calculator (discussed below).

Once the data has been received in the cryptographic accelerator input queue 332, the cryptographic accelerator 334 will operate on the data to encrypt/decrypt or otherwise process the data, and output the data as encrypted/decrypted data 338. As noted above, the data may be placed in a raster and retrieved by being polled by the other components of the network element or alternatively placed in a cryptographic accelerator output queue for subsequent transmission to the remaining systems of the network element. However, since the cryptographic accelerator is generally a bottleneck in the network element, the data may generally output directly to the network element without implementing an output queue structure. The output queue illustrated in the drawings is therefore intended to merely convey that the data is output at that point and the invention is not limited to an embodiment that utilizes an output queue at the output of the cryptographic accelerator.

The cryptographic accelerator 334 will process whatever data 352 is in the cryptographic accelerator input queue 332 during the processing cycle which, in this example, is 5 ms. If there is too much data 352 in the cryptographic accelerator input queue 332, the cryptographic accelerator will not be able to process all the input data 402 and, hence, some of the packets transferred to the cryptographic accelerator input queue may be dropped. Conversely, if not enough data 352 is input to the cryptographic accelerator input queue 332, the cryptographic accelerator will be able to process the data in less than the 5 ms scheduling period and, hence, will remain idle for a portion of the processing cycle. Either option is less than ideal. In the first instance, where too much data is input, the additional data may end up being dropped, whereas in the second instance the full ability of the cryptographic accelerator is not being utilized to thereby slow down the overall rate at which the network element is able to handle data.

According to an embodiment of the invention, the cryptographic system 300 includes a dynamic bandwidth calculator 340 configured to monitor the output of the cryptographic accelerator 334 and determine, from the output bandwidth, how much data should be transferred by the CBQ scheduler 320 from the class based input queues 314 to the cryptographic accelerator input queue 332 in the subsequent cycle.

As noted above, during every processing cycle, a given quantity of data will be transmitted into the cryptographic accelerator input queue 332 and, assuming that the cryptographic accelerator is able to handle that quantity of data, the cryptographic accelerator will also output the same quantity of data during the 5 ms processing period. However, the rate at which the data is made available at the output 336 of the cryptographic accelerator 334 is not likely to be constant during the 5 ms processing cycle.

For example, assume that the cryptographic accelerator input queue 332 is only provided with enough data to occupy the cryptographic accelerator for part of the processing cycle. The cryptographic accelerator is not aware that there is insufficient data in the cryptographic accelerator input queue 332 and will therefore process the data at the maximum rate. Accordingly, the cryptographic accelerator will process the data from the cryptographic accelerator input queue 332 and output the data at the maximum possible rate for the beginning part of the processing cycle. Once the cryptographic accelerator runs out of data in the cryptographic accelerator input queue, it will stop working and wait for a new batch of data to be delivered to the cryptographic accelerator input queue. The particular rate at which the cryptographic accelerator outputs data (before it runs out of data) will depend on the particular mix of small and large packets, the type of traffic, whether the cryptographic accelerator is encrypting/decrypting the packets, and other similar factors. The rate at which the cryptographic accelerator outputs data may be used as feedback by the cryptographic system to determine how much data should be transmitted into the cryptographic accelerator input queue during the next processing cycle.

In the embodiment shown in FIG. 3, the dynamic bandwidth calculator thus measures the actual output bandwidth of the cryptographic accelerator 334 during operation and uses that value to update a calculation of how much data should be transferred by the CBQ scheduler 320 to the cryptographic accelerator input queue 332. Thus, the dynamic bandwidth calculator 340 provides a feedback loop to enable the input to the cryptographic accelerator to be adjusted to better match the operating conditions of the cryptographic accelerator. This allows the actual operating bandwidth of the cryptographic accelerator to be used to control the amount of data that is input so that the quantity of data input during a cycle is likely to be closer matched to the quantity of data the cryptographic accelerator is able to process during that cycle.

The dynamic bandwidth calculator 340 dynamically estimates the cryptographic accelerator bandwidth for the upcoming cycle based on the observed bandwidth of the cryptographic accelerator bandwidth for the previous cycle and the history of how much bandwidth the cryptographic accelerator has exhibited in the recent past. For example, the dynamic bandwidth calculator 340 may use an algorithm such as the exponential weighted moving average in which the value of an estimate for an upcoming cycle is calculated according to the following formula (Equation #1):

$$BWa = (1-W)*BWa + W*BWc \quad \text{(Equation \#1)}$$

in which BWa is the average bandwidth of the cryptographic accelerator (this value is used to set the amount of data that is to be transferred by the CBQ scheduler from the class based input queues 314 to the cryptographic accelerator input queues during a given cycle); BWc is the current measured output bandwidth of the cryptographic accelerator from the previous cycle; and W is the weight to be afforded the current bandwidth of the cryptographic accelerator relative to the historic bandwidth of the cryptographic accelerator 334. For example, assume a weight W=0.25. The new bandwidth for a given processing cycle will be determined by adding 0.75 the bandwidth of the previous cycle, plus 0.25 the bandwidth measured at the output of the cryptographic accelerator during the previous cycle. Thus, as the cryptographic accelerator starts to process data faster, for example if the average packet size being input to the cryptographic accelerator increases, the higher output bandwidth from the cryptographic accelerator will cause the BWa value to increase which, in turn, will cause a larger amount of data to be transferred by the CBQ scheduler from the class based queues 314 into the input queue 332. Other weighting formulas may be used to adjust the moving average as well.

The dynamic bandwidth calculator may calculate a new bandwidth estimate during every cycle, or alternatively may perform a threshold analysis first to determine if the bandwidth should be changed. For example, the dynamic bandwidth calculator may determine if the observed bandwidth BWc for the previous cycle was within 5% or another threshold of the input bandwidth BWa and, if so, determine that no change should be made to the bandwidth estimation for the subsequent cycle. Different threshold values may be chosen depending on how often it is determined to be desirable to change the amount of data being transferred by the CBQ scheduler.

Figure 5:
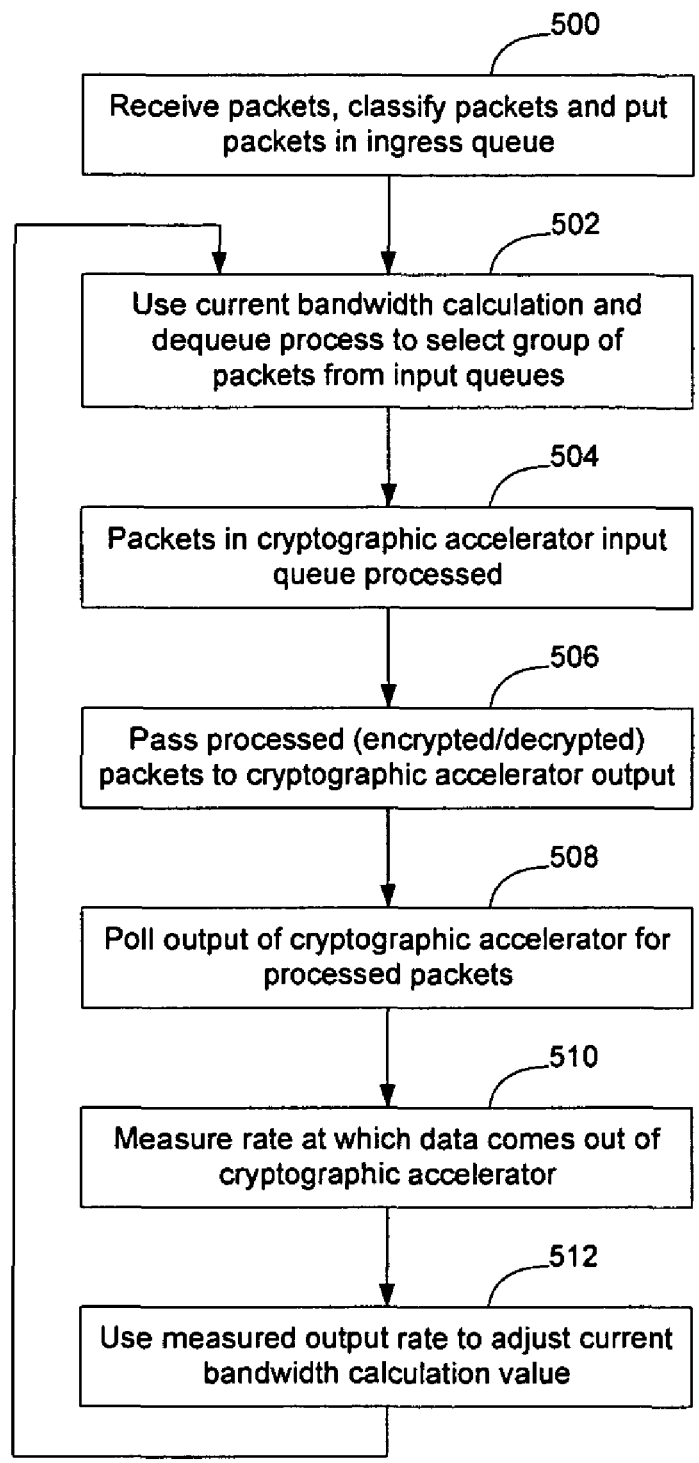
FIG. 5 is a flow diagram illustrating one example of a process for increasing the output of a cryptographic system according to an embodiment of the invention.

FIG. 5 illustrates a flow chart of a process that may be used to implement an embodiment of the invention. As shown in FIG. 5, when a packet is received the packet will be classified and put into an ingress queue (500). The CBQ will use the current bandwidth calculation and the dequeue process to select a group of packets from the ingress queues to be transferred to the cryptographic accelerator input queue (502).

At the start of the cycle, the cryptographic accelerator will start to process packets in the cryptographic accelerator input queue (504). The encrypted/decrypted packets will be passed to the cryptographic accelerator output (506). The network element will poll the cryptographic accelerator output for processed packets (508) and pass the encrypted/decrypted packets to the remaining portion of the network element for subsequent processing. For example, the encrypted/decrypted packets may be passed to the switch fabric to be switched within the network element and then output from the network element.

The dynamic bandwidth calculator will measure the rate (BWc) at which data comes out of the cryptographic accelerator (510) and use the measured output rate (BWc) to adjust the current estimated bandwidth value (BWa) so that the new estimate may be used in a subsequent cycle when selecting data by the CBQ scheduler (512).

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for adjusting a rate at which packets are provided to a cryptographic engine having a cryptographic accelerator input queue and a cryptographic accelerator, the computer program comprising a set of instructions which, when executed by a computer, cause the computer to perform a method comprising the steps of:

providing the cryptographic engine with a group of packets to be encrypted or decrypted during a processing cycle, an amount of data contained in the group of packets being determined according to an estimation of a likely amount of data able to be processed by the cryptographic accelerator during the processing cycle;

measuring an output bandwidth of the cryptographic accelerator during the processing cycle; and using the output bandwidth of the cryptographic accelerator during the processing cycle as feedback to adjust an amount of data input to the cryptographic accelerator to be processed by the cryptographic accelerator during a subsequent processing cycle.

2. The non-transitory tangible computer readable storage medium of claim 1, wherein the step of providing the cryptographic engine with a group of packets comprises transferring a group of packets to the cryptographic accelerator input queue for processing by the cryptographic accelerator.

3. The non-transitory tangible computer readable storage medium of claim 1, wherein the subsequent processing cycle is the next subsequent processing cycle.

4. The non-transitory tangible computer readable storage medium of claim 1, wherein the cryptographic engine has a fixed processing cycle.

5. The non-transitory tangible computer readable storage medium of claim 4, wherein if the cryptographic engine is not provided with a sufficiently large group of packets to be encrypted or decrypted during the processing cycle, the cryptographic accelerator will process the group of packets at maximum rate until it runs out of packets to process, and then remain idle during the rest of the processing cycle.

6. The non-transitory tangible computer readable storage medium of claim 5, wherein the output bandwidth of the cryptographic accelerator that is measured is the rate at which the cryptographic accelerator outputs processed data during the processing cycle before the cryptographic accelerator runs out of packets to process from the cryptographic accelerator input queue.

7. The non-transitory tangible computer readable storage medium of claim 1, wherein the feedback is used as part of a closed loop feedback system.

8. The non-transitory tangible computer readable storage medium of claim 1, wherein the cryptographic engine has a variable processing cycle, and wherein the feedback is used to adjust a length of the processing cycle.

9. A cryptographic system, comprising:
a plurality of input queues;
a packet classifier to classify received packets and cause each packet received by the cryptographic system to be stored in an appropriate input queue;
a cryptographic accelerator to process packets by encrypting or decrypting the packets;
a cryptographic accelerator input queue to store packets for processing by the cryptographic accelerator during a processing cycle;
a class based queue scheduler to select data from the input queues to be processed by the cryptographic accelerator according to a cryptographic accelerator processing rate;
a dynamic bandwidth calculator to use an output rate at which the cryptographic accelerator processes packets during a preceding cycle as feedback to set the cryptographic accelerator processing rate for a subsequent cycle.

10. The cryptographic system of claim 9, wherein the input queues are class based queues.

11. The cryptographic system of claim 9, wherein the plurality of input queues comprise separate queues for each flow of traffic that are to be treated individually by the network element.

12. The cryptographic system of claim 9, wherein the class based queue scheduler performs traffic shaping by adjusting the size of the input queues.

13. The cryptographic system of claim 9, wherein the class based queue scheduler controls how much traffic may be read from each of the input queues.

14. The cryptographic system of claim 9, wherein the cryptographic accelerator operates on a fixed processing cycle.

15. The cryptographic system of claim 9, wherein the cryptographic engine has a fixed processing cycle.

16. The cryptographic system of claim 15, wherein if the cryptographic engine is not provided with a sufficiently large group of packets to be encrypted or decrypted during the processing cycle, the cryptographic accelerator will process the group of packets at maximum rate until it runs out of packets to process, and then remain idle during the rest of the processing cycle.

17. The cryptographic system of claim 16, wherein the output bandwidth of the cryptographic accelerator that is measured is the rate at which the cryptographic accelerator outputs processed data during the processing cycle before the cryptographic accelerator runs out of packets to process from the cryptographic accelerator input queue.

18. The cryptographic system of claim 9, wherein the cryptographic engine has a variable processing cycle, and wherein the feedback is used to adjust a length of the processing cycle.

* * * * *